United States Patent
Speckmann et al.

(10) Patent No.: US 7,535,216 B2
(45) Date of Patent: May 19, 2009

(54) INCREMENTAL DISPLACEMENT TRANSDUCER AND METHOD FOR DETERMINING A DISPLACEMENT OF A FIRST OBJECT RELATIVE TO A SECOND OBJECT

(75) Inventors: Christian Speckmann, Bensheim (DE); Timo Glam, Mannheim (DE)

(73) Assignee: Pepperl + Fuchs GmbH, Mannheim (DE)

(*) Notice: Subject to any disclaimer, the term of this patent is extended or adjusted under 35 U.S.C. 154(b) by 0 days.

(21) Appl. No.: 12/120,772

(22) Filed: May 15, 2008

(65) Prior Publication Data

US 2008/0284417 A1  Nov. 20, 2008

(30) Foreign Application Priority Data

May 16, 2007  (DE) .................. 10 2007 022 942

(51) Int. Cl.
*G01B 7/14* (2006.01)
*G01R 33/00* (2006.01)

(52) U.S. Cl. .............. 324/207.15; 324/207.24; 324/239; 324/243

(58) Field of Classification Search ..................
324/207.13–207.15, 207.24, 207.26, 239,
324/243–244, 260; 33/1 PT, 700, 706, 708
See application file for complete search history.

(56) References Cited

U.S. PATENT DOCUMENTS

| 4,893,078 A | 1/1990 | Auchterlonie |
| 5,003,260 A | 3/1991 | Auchterlonie |

FOREIGN PATENT DOCUMENTS

| DE | 31 00 486 A1 | 2/1982 |
| DE | 197 01 319 A1 | 7/1998 |
| EP | 1071927 | 10/1999 |

*Primary Examiner*—Bot LeDynh
(74) *Attorney, Agent, or Firm*—John A. Merecki; Hoffman Warnick LLC

(57) ABSTRACT

The invention relates to an incremental displacement transducer for determining a displacement of a first object relative to a second object with a scanning unit linked with the first object for scanning a division track linked with the second object having first areas and second areas alternately arranged with a period length, the first areas having a first physical property and the second areas a second physical property differing therefrom. The scanning unit has a plurality of sensors for scanning the first areas and second areas on the basis of the first and/or second physical property. An evaluating unit is linked with the scanning unit for determining the displacement on the basis of the measuring signals of the sensors.

18 Claims, 4 Drawing Sheets

| x | C1 | C2 | C3 | C4 | S1 | S2 |
|---|---|---|---|---|---|---|
| 0,01 | 0 | 0 | 0 | 1,99 | 0 | 0 |
| 0,51 | 1,01 | 0 | 0 | 0,99 | 1 | 0 |
| 1,01 | 1,99 | 0 | 0 | 0 | 1 | 0 |
| 1,51 | 0,99 | 1,01 | 0 | 0 | 1 | 1 |
| 2,01 | 0 | 1,99 | 0 | 0 | 1 | 1 |
| 2,51 | 0 | 0,99 | 1,01 | 0 | 0 | 1 |
| 3,01 | 0 | 0 | 1,99 | 0 | 0 | 1 |
| 3,51 | 0 | 0 | 0,99 | 1,01 | 0 | 0 |
| 4,01 | 0 | 0 | 0 | 1,99 | 0 | 0 |
| 4,51 | 1,01 | 0 | 0 | 0,99 | 1 | 0 |
| 5,01 | 1,99 | 0 | 0 | 0 | 1 | 0 |
| 5,51 | 0,99 | 1,01 | 0 | 0 | 1 | 1 |
| 6,01 | 0 | 1,99 | 0 | 0 | 1 | 1 |
| 6,51 | 0 | 0,99 | 1,01 | 0 | 0 | 1 |
| 7,01 | 0 | 0 | 1,99 | 0 | 0 | 1 |
| 7,51 | 0 | 0 | 0,99 | 1,01 | 0 | 0 |
| 8,01 | 0 | 0 | 0 | 1,99 | 0 | 0 |
| 8,51 | 1,01 | 0 | 0 | 0,99 | 1 | 0 |
| 9,01 | 1,99 | 0 | 0 | 0 | 1 | 0 |
| 9,51 | 0,99 | 1,01 | 0 | 0 | 1 | 1 |
| 10,01 | 0 | 1,99 | 0 | 0 | 1 | 1 |
| 10,51 | 0 | 0,99 | 1,01 | 0 | 0 | 1 |
| 11,01 | 0 | 0 | 1,99 | 0 | 0 | 1 |
| 11,51 | 0 | 0 | 0,99 | 1,01 | 0 | 0 |

| x | C1 | C2 | C3 | C4 | S1 | S2 | S3 | S4 |
|---|----|----|----|----|----|----|----|----|
| 0,01 | 0 | 0 | 1,9 | 2,01 | 0 | 0 | 0 | 0 |
| 0,51 | 1,01 | 0 | 0,9 | 2,99 | 0 | 0 | 1 | 0 |
| 1,01 | 2,01 | 0 | 0 | 1,99 | 1 | 0 | 1 | 0 |
| 1,51 | 2,99 | 1,01 | 0 | 0,99 | 1 | 0 | 1 | 1 |
| 2,01 | 1,99 | 2,01 | 0 | 0 | 1 | 1 | 1 | 1 |
| 2,51 | 0,99 | 2,99 | 1,01 | 0 | 1 | 1 | 0 | 1 |
| 3,01 | 0 | 1,99 | 2,01 | 0 | 0 | 1 | 0 | 1 |
| 3,51 | 0 | 0,99 | 2,99 | 1,01 | 0 | 1 | 0 | 0 |
| 4,01 | 0 | 0 | 1,99 | 2,01 | 0 | 0 | 0 | 0 |
| 4,51 | 1,01 | 0 | 0,99 | 2,99 | 0 | 0 | 1 | 0 |
| 5,01 | 2,01 | 0 | 0 | 1,99 | 1 | 0 | 1 | 0 |
| 5,51 | 2,99 | 1,01 | 0 | 0,99 | 1 | 0 | 1 | 1 |
| 6,01 | 1,99 | 2,01 | 0 | 0 | 1 | 1 | 1 | 1 |
| 6,51 | 0,99 | 2,99 | 1,01 | 0 | 1 | 1 | 0 | 1 |
| 7,01 | 0 | 1,99 | 2,01 | 0 | 0 | 1 | 0 | 1 |
| 7,51 | 0 | 0,99 | 2,99 | 1,01 | 0 | 1 | 0 | 0 |
| 8,01 | 0 | 0 | 1,99 | 2,01 | 0 | 0 | 0 | 0 |
| 8,51 | 1,01 | 0 | 0,99 | 2,99 | 0 | 0 | 1 | 0 |
| 9,01 | 2,01 | 0 | 0 | 1,99 | 1 | 0 | 1 | 0 |
| 9,51 | 2,99 | 1,01 | 0 | 0,99 | 1 | 0 | 1 | 1 |
| 10,01 | 1,99 | 2,01 | 0 | 0 | 1 | 1 | 1 | 1 |
| 10,51 | 0,99 | 2,99 | 1,01 | 0 | 1 | 1 | 0 | 1 |
| 11,01 | 0 | 1,99 | 2,01 | 0 | 0 | 1 | 0 | 1 |
| 11,51 | 0 | 0,99 | 2,99 | 1,01 | 0 | 1 | 0 | 0 |

| x | C1 | C2 | C3 | C4 | C5 | C6 | C7 | C8 | S1 | S2 |
|---|---|---|---|---|---|---|---|---|---|---|
| 0,01 | 1,01 | 0 | 0 | 0 | 0 | 0 | 0 | 0,99 | 1 | 0 |
| 0,51 | 1,99 | 0 | 0 | 0 | 0 | 0 | 0 | 0 | 1 | 0 |
| 1,01 | 0,99 | 1,01 | 0 | 0 | 0 | 0 | 0 | 0 | 1 | 1 |
| 1,51 | 0 | 1,99 | 0 | 0 | 0 | 0 | 0 | 0 | 1 | 1 |
| 2,01 | 0 | 0,99 | 1,01 | 0 | 0 | 0 | 0 | 0 | 0 | 1 |
| 2,51 | 0 | 0 | 1,99 | 0 | 0 | 0 | 0 | 0 | 0 | 1 |
| 3,01 | 0 | 0 | 0,99 | 1,01 | 0 | 0 | 0 | 0 | 0 | 0 |
| 3,51 | 0 | 0 | 0 | 1,99 | 0 | 0 | 0 | 0 | 0 | 0 |
| 4,01 | 0 | 0 | 0 | 0,99 | 1,01 | 0 | 0 | 0 | 1 | 0 |
| 4,51 | 0 | 0 | 0 | 0 | 1,99 | 0 | 0 | 0 | 1 | 0 |
| 5,01 | 0 | 0 | 0 | 0 | 0,99 | 1,01 | 0 | 0 | 1 | 1 |
| 5,51 | 0 | 0 | 0 | 0 | 0 | 1,99 | 0 | 0 | 1 | 1 |
| 6,01 | 0 | 0 | 0 | 0 | 0 | 0,99 | 1,01 | 0 | 0 | 1 |
| 6,51 | 0 | 0 | 0 | 0 | 0 | 0 | 1,99 | 0 | 0 | 1 |
| 7,01 | 0 | 0 | 0 | 0 | 0 | 0 | 0,99 | 1,01 | 0 | 0 |
| 7,51 | 0 | 0 | 0 | 0 | 0 | 0 | 0 | 1,99 | 0 | 0 |
| 8,01 | 1,01 | 0 | 0 | 0 | 0 | 0 | 0 | 0,99 | 1 | 0 |
| 8,51 | 1,99 | 0 | 0 | 0 | 0 | 0 | 0 | 0 | 1 | 0 |
| 9,01 | 0,99 | 1,01 | 0 | 0 | 0 | 0 | 0 | 0 | 1 | 1 |
| 9,51 | 0 | 1,99 | 0 | 0 | 0 | 0 | 0 | 0 | 1 | 1 |
| 10,01 | 0 | 0,99 | 1,01 | 0 | 0 | 0 | 0 | 0 | 0 | 1 |
| 10,51 | 0 | 0 | 1,99 | 0 | 0 | 0 | 0 | 0 | 0 | 1 |
| 11,01 | 0 | 0 | 0,99 | 1,01 | 0 | 0 | 0 | 0 | 0 | 0 |
| 11,51 | 0 | 0 | 0 | 1,99 | 0 | 0 | 0 | 0 | 0 | 0 |
| 12,01 | 0 | 0 | 0 | 0,99 | 1,01 | 0 | 0 | 0 | 1 | 0 |
| 12,51 | 0 | 0 | 0 | 0 | 1,99 | 0 | 0 | 0 | 1 | 0 |
| 13,01 | 0 | 0 | 0 | 0 | 0,99 | 1,01 | 0 | 0 | 1 | 1 |
| 13,51 | 0 | 0 | 0 | 0 | 0 | 1,99 | 0 | 0 | 1 | 1 |
| 14,01 | 0 | 0 | 0 | 0 | 0 | 0,99 | 1,01 | 0 | 0 | 1 |
| 14,51 | 0 | 0 | 0 | 0 | 0 | 0 | 1,99 | 0 | 0 | 1 |
| 15,01 | 0 | 0 | 0 | 0 | 0 | 0 | 0,99 | 1,01 | 0 | 0 |
| 15,51 | 0 | 0 | 0 | 0 | 0 | 0 | 0 | 1,99 | 0 | 0 |
| 16,01 | 1,01 | 0 | 0 | 0 | 0 | 0 | 0 | 0,99 | 1 | 0 |
| 16,51 | 1,99 | 0 | 0 | 0 | 0 | 0 | 0 | 0 | 1 | 0 |
| 17,01 | 0,99 | 1,01 | 0 | 0 | 0 | 0 | 0 | 0 | 1 | 1 |

INCREMENTAL DISPLACEMENT TRANSDUCER AND METHOD FOR DETERMINING A DISPLACEMENT OF A FIRST OBJECT RELATIVE TO A SECOND OBJECT

FIELD OF THE INVENTION

The present invention is relates to an incremental displacement transducer and to a method for determining a displacement of a first object relative to a second object.

RELATED ART

An incremental displacement transducer for determining a displacement of a first object relative to a second object is, e.g., known from DE 197 01 319 A1. Such an incremental displacement transducer has a scanning unit linked or to be linked with the first object for scanning a division track linked or to be linked with the second object having first areas and second areas arranged alternately with a period length. The first areas have a first physical property and the second areas a second physical property differing therefrom. The scanning unit also has a plurality of sensors for scanning the first areas and second areas on the basis of the first and/or second physical property. Finally an evaluating unit, linked with the scanning unit, is provided for determining the displacement on the basis of measuring signals of the sensors.

In such a method, which is also known from DE 197 01 319 A1, a division track linked with the first object is scanned with a plurality of sensors linked with the second object. The division track has first areas with a first physical property and second areas with a second physical property, which are alternately arranged with a period length and from measuring signals of the sensors obtained on the basis of the first and/or second physical property the displacement of the first object relative to the second object is determined.

Inductive incremental displacement transducers are also described in DE 31 00 486 A1, EP 1 071 927 B1, U.S. Pat. No. 4,893,078 and U.S. Pat. No. 5,003,260.

Incremental displacement transducers are used for measuring position changes. There, two mutually displaced sensors in each case determine the position of a division track. The movement of the division track relative to the sensors can be determined by counting the single pulses. As the signals generated by both sensors have a phase displacement of, e.g., 90°, a direction detection is also possible.

If use is made of inductive sensors for the incremental displacement transducer, difficulties arise due to the dependence of the switching point of the sensors during a lateral approach of a metallic object, e.g., a conductive area of the division track, on the distance of the sensor from said division track. The closer the conductive area of the division track is to the sensor the earlier it is detected.

Thus, the 1:1 pulse-interval ratio desired for direction detection can in this way only be obtained for a specific spacing.

In addition, in the prior art there is a need for division tracks in which the first and second areas in each case have the same extension. Thus, usually the division tracks must be separately applied to the objects to be monitored, even if there are already repeating structures, which are fundamentally suitable for the detection of a displacement.

SUMMARY OF THE INVENTION

The present invention provides an incremental displacement transducer and a method for determining the displacement of a first object relative to a second object where, largely independently of the specific spacing of the sensors used with respect to a division track, reliable measurement results are obtained.

The incremental displacement transducer of the aforementioned type is inventively further developed in that the scanning unit has at least three sensors, which are in particular distributed in a spaced manner over at least one period length along the division track, that in the evaluation unit for determining the displacement a first switching signal and a second switching signal are generated from the measuring signals of the sensors, that the first switching signal assumes a first value, particularly HIGH if the particular sensor which emits a maximum measuring signal belongs to a first subgroup of sensors, and otherwise assumes a second value, particularly LOW, that the second switching signal assumes a first value, particularly HIGH if the particular sensor which emits a maximum measuring signal belongs to a second subgroup of sensors, and otherwise assumes a second value, particularly LOW, and where at least one sensor belongs both to the first subgroup and to the second subgroup.

The method of the aforementioned type is inventively further developed in that at least three sensors are arranged in spaced manner from one another over at least one period length along the division track, that the displacement is determined on the basis of a first switching signal and a second switching signal, that the first switching signal assumes a first value, particularly HIGH if the particular sensor which emits a maximum measuring signal belongs to a first subgroup of sensors, and otherwise assumes a second value, particularly LOW, that the second switching signal assumes a first value, particularly HIGH if the particular sensor which emits a maximum measuring signal belongs to a second subgroup of sensors, and otherwise assumes a second value, particularly LOW, and where at least one sensor belongs both to the first subgroup and to the second subgroup.

In accordance with the present invention, the spacing dependence of the sensor signals is eliminated by a logical evaluation where it is no longer a matter of the absolute level of the measuring signals, but instead only the relative level of the particular sensor signal compared to those of the other sensors. Further, linked therewith, at least three sensors are arranged over a period of the division track and a subdivision of said sensors into subgroups takes place, at least one sensor forming part of both subgroups.

One advantage of the inventive solution is the spacing independence of the evaluation. This permits universal uses in the industrial sector, because there is no need for a precise setting up of the measuring device with respect to the division track.

Another advantage is that the division track, as a fundamental difference compared with known solutions, need not have a 1:1 division. It is fundamentally possible to have any random periodic structure for generating the incremental signal.

The maximum measuring signal is here understood to mean the measuring signal which is supplied for a maximum approach of the corresponding first or second area to the sensor in question and which is supplied by the latter. Relative to 0, the value of this can optionally be a minimum value. The latter is, e.g., the case if, using an inductive sensor, determination takes place of the movement of a metal plate, where in periodic, but comparatively large intervals holes are located. If a sensor is positioned directly in front of the hole, damping decreases to a minimum value but which, based on the complete damping, is a maximum value, namely a maximum deviation value.

In accordance with the present invention, the signals of two adjacent sensors overlap within the desired detection range of the bar. This means that the lateral spacing of two adjacent sensors compared with the lateral extension of the smaller of the two areas of the division track is chosen in such a way that always temporarily both sensors can supply a detection signal on the basis of this area.

It follows from this that the web width of a lug of a division track must have a certain minimum width, so that at least temporarily two adjacent sensors supply a signal on the basis of the lug. This condition can be fulfilled on the one hand by a certain minimum width of the first and/or second area and on the other by a certain lateral maximum spacing of the sensors.

As long as the above condition relative to the sensor spacing is fulfilled, the sensors can be fundamentally randomly distributed over a period of the division track or also over several periods. In principle, it is possible to have here variable mutual spacings of the sensors and in preferred variants the sensors are, however, uniformly spaced from one another, because this leads to an easier evaluation.

Fundamentally a spacing-independent signal can be generated with two sensors per period, if also the division track has a ratio of the first areas to the second areas of 1:1. However, this only allows the generation of a single incremental signal and it is impossible to determine the direction of the displacement of the first object relative to the second object.

The target width, i.e., for example the width or lateral expansion of the first area can also exceed a gap width, i.e., a lateral expansion of the second area. It may then be necessary in place of the maximum signal, as explained hereinbefore, to use as the criterion the signal minimum.

The switching signals can also be emitted in inverted manner, i.e., instead of the value HIGH the value LOW is emitted and vice versa.

In principle, any random physical property which can be determined with sensors can be used for forming the division track. For example, the first and second areas can have different magnetic, optical or also mechanical properties.

Implementation variants of the invention offer particularly numerous possible uses and are particularly reliable relative to operation in industrial environments where the first areas are electrically conductive and the second areas electrically insulating and the sensors are inductive sensors.

Two phase-displaced, spacing-independent signals can be generated if the scanning unit has three sensors, the first subgroup being formed by the first and second sensors and the second subgroup by the second and third sensors. This leads to a minimum of components on the sensor side.

In a variant of the inventive incremental displacement transducer the scanning unit has four sensors and the first subgroup is formed by the first and second sensors and the second subgroup by the second and third sensors. In this embodiment it is possible to obtain two switching signals phase-displaced by 90° and if additionally the division track has a 1:1 division ratio, use can be made of known evaluation algorithms. For this purpose the sensors are arranged with a spacing of ¼ of the division period.

It is fundamentally also possible to poll periodic structures with a higher scanning or division ratio. The scanning unit can, e.g., have eight sensors and the first subgroup can be formed by the first, second, fifth and sixth sensors and the second subgroup by the second, third, sixth and seventh sensors.

The numerical designation of the sensors is here to be understood in such a way that, e.g., when the sensors are arranged in a row the far left sensor is designated the first sensor, that which is next to the right the second sensor and, e.g., the far right sensor the eighth sensor.

On the basis of the above statements the greater the division ratio of the periodic structure the greater the number of sensors needed.

The division track can fundamentally comprise a random periodic structure, which has suitable physical properties for scanning purposes. Thus, an already existing hole grid can, e.g., be used as the division track on a moving device or a device which is to be monitored.

Provided that the condition that the subgroup has in each case at least one common sensor there can be a random choice of the sensors for the first and second subgroups for the formation of the first and second switching signals.

However, evaluation is easier if the first subgroup and second subgroup include the same number of sensors.

To obtain switching signals with a scanning ratio of 1:1, it is also preferable for the first and second subgroups to in each case include half of all the sensors, which also means that there is an even number of sensors.

BRIEF DESCRIPTION OF THE DRAWINGS

Further advantages and features of the invention are explained in greater detail hereinafter relative to the attached diagrammatic drawings.

DETAILED DESCRIPTION OF THE INVENTION

Figure 1:
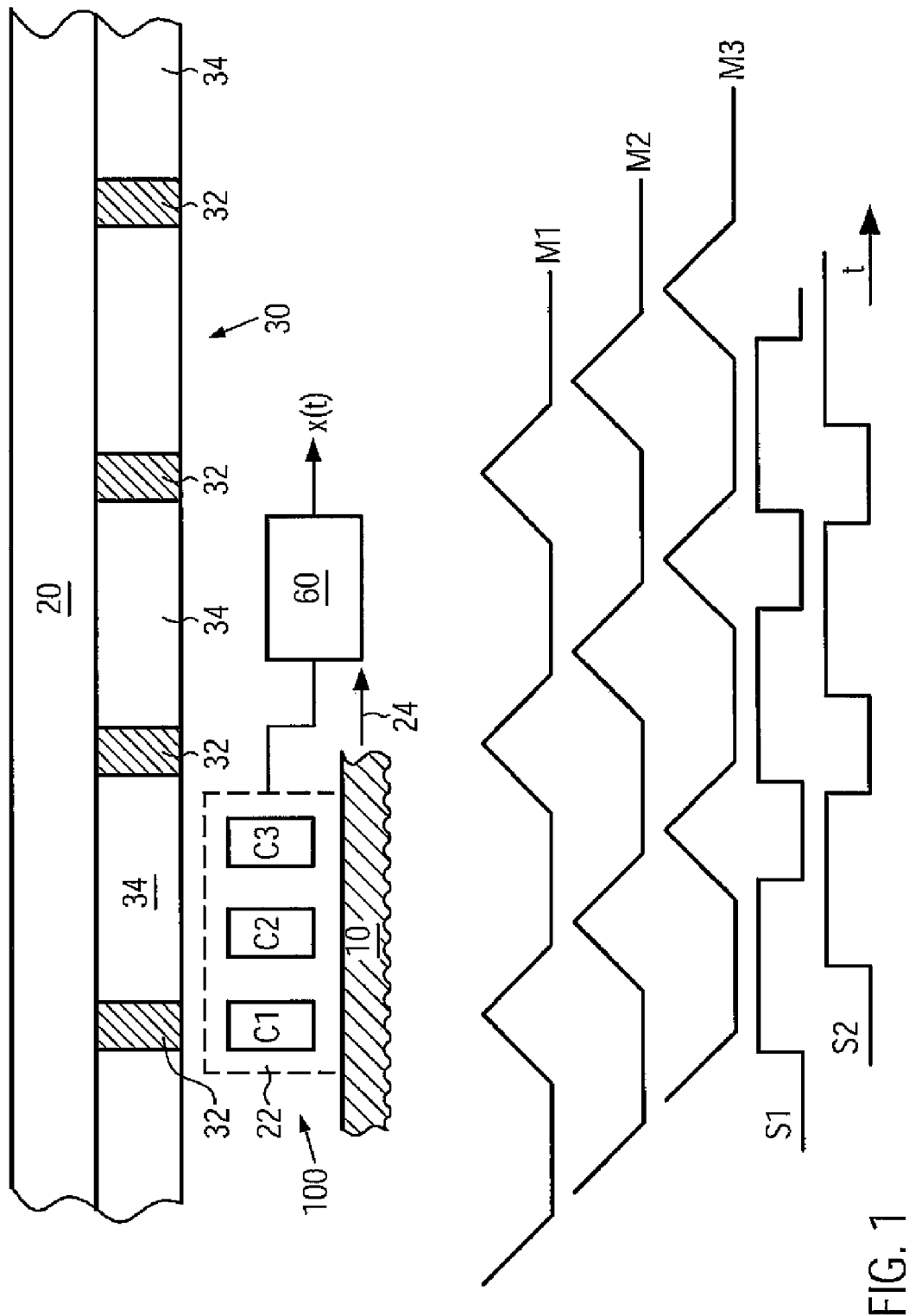
FIG. 1 depicts a first embodiment of the inventive incremental displacement transducer with three sensors.

The incremental displacement transducer 100 according to the invention comprises a scanning unit 22, located at a first object 10, with a plurality of sensors C1, C2, C3 linked with an evaluating unit 60.

Sensors C1, C2, C3 of scanning unit 22 are used for scanning a division track 30 located at a second object 20. Division track 30 essentially comprises first areas 32 and second areas 34 arranged in periodically alternating manner. The first and second areas 32, 34 have in each case different physical properties so as to allow the scanning of sensors C1, C2, C3. Thus, e.g., the first areas 32 can be electrically conductive, metallic lugs and correspondingly the second areas 34 can be holes or recesses in a metal plate. The sensors C1, C2, C3 are then appropriately inductive sensors, e.g., inductive proximity switches.

In the case of a lateral relative movement of the first object 10 with respect to the second object 20 in a direction indicated by arrow 24, the time behavior of measuring signals M1, M2, M3 and the switching signals S1, S2 derived therefrom in evaluating unit 60 are obtained and these are diagrammatically represented in the lower area of FIG. 1.

Signal M1 belongs to sensor C1, signal M2 to sensor C2, and signal M3 to sensor C3. As is clear from the signal paths, the measuring signal is in each case at a maximum if the corresponding sensor is directly upstream of a conductive first area 32, i.e., the damping of the proximity switch is at a maximum. The paths also make it clear that as a result of the arrangement of the sensors C1, C2, C3 distributed over the period of division track 30, measuring signals M1, M2, M3 have a phase displacement of 120°. The switching signals S1, S2 shown in the lower area of FIG. 1 are obtained by a logical evaluation in evaluating unit 60, which switches signal S1 to HIGH if the maximum measuring signal is either supplied by sensor C1 or C2 and is otherwise switched to LOW. In addition, signal S2 is switched to HIGH if the maximum signal is supplied by one of the sensors C2 or C3, but is otherwise switched to LOW. In this embodiment, the sensor C2 is consequently part of both the first and the second subgroup of sensors. In the case of a relative movement in one direction it is possible to determine from each of the switching signals S1 the speed of said displacement and, if there is a suitable starting signal, also the absolute value of the displacement. In the case of a random relative displacement direction information concerning the direction, as is apparent from the relative phase position of signals S1 and S2, can be obtained from the time sequence of said switching signals. Evaluating unit 60 supplies a displacement signal x(t) for further use, e.g., in a process control.

Figures 2, 3:
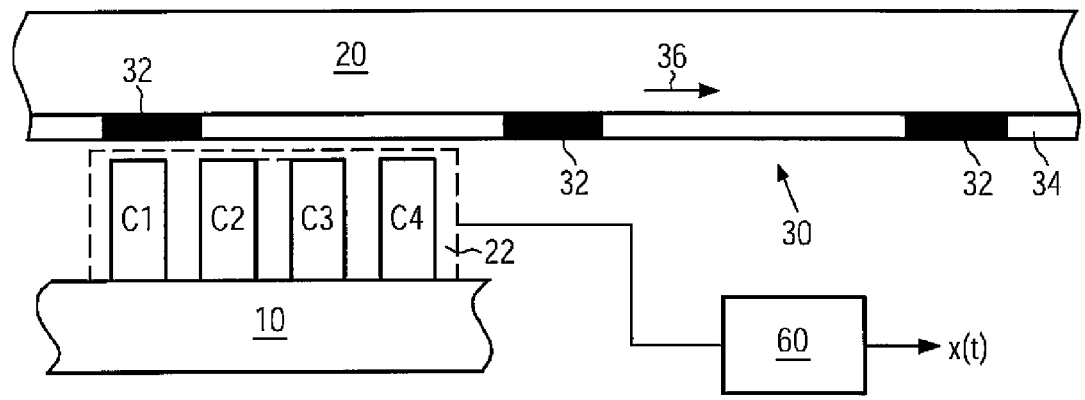
FIG. 2 depicts a second embodiment of the inventive incremental displacement transducer with four sensors.
FIG. 3 depicts, in table form, measuring signals and switching signals plotted against a displacement of the first object relative to the second object for the embodiment of FIG. 2.

A second embodiment of an inventive incremental displacement transducer is shown in FIG. 2. In all the drawings equivalent components carry the same reference numerals as in FIG. 1. Unlike in FIG. 1, in the variant of FIG. 2 there are altogether four sensors C1, C2, C3 and C4 arranged along an extension direction 36 of division track 30 over one period. The lateral expansion, i.e., the expansion of extension direction 36, of the first areas 32 is here ¼ of the period p. Correspondingly, the lateral expansion of the second areas 34 is ¾ of the period p. As is clear from FIG. 2, sensors C1, C2, C3 and C4 are positioned with a spacing of ¼ of the period length.

The paths of measuring signals of sensors C1, C2, C3 and C4 and the switching signals S1 and S2 derived therefrom are shown in table form in FIG. 3 plotted against a displacement x of the first object 10 relative to the second object 20. These paths correspond to the signal paths graphically represented in FIG. 1. The logical switching condition here is that the switching signal S1 is switched to 1, if either the first sensor C1 or the second sensor C2 supplies the maximum signal, but otherwise to 0. Switching signal S2 is set to 1 if the maximum signal is supplied from one of the sensors C2 or C3 and is otherwise 0. The values for the displacement x are so chosen in the table of FIG. 3 that the switchover points are made clear. These switching conditions supply two switching signals S2 and S3 with a 90° phase displacement. The further evaluation with respect to the position signal x(t) is then simple and use can be made of known evaluation algorithms.

Figures 4, 5:
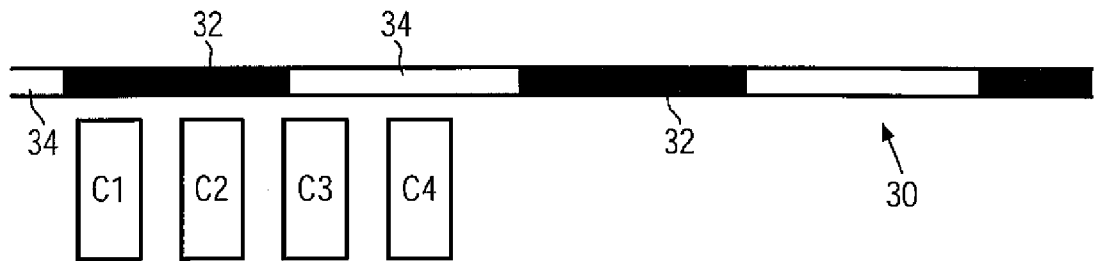
FIG. 4 depicts a third embodiment of the inventive incremental displacement transducer with four sensors.
FIG. 5 depicts, in table form, measuring signals and switching signals plotted against a displacement of the first object relative to the second object for the embodiment of FIG. 4.

A third embodiment of the inventive incremental displacement transducer is described in conjunction with FIGS. 4 and 5. FIG. 4 diagrammatically shows the arrangement of four sensors C1, C2, C3 and C4 along a division track 30. This embodiment essentially corresponds to the variant of FIG. 3. The sole difference is that the lateral expansion of the first areas 32 and the lateral expansion of the second areas 34 of the division track 30 in each case amount to half the period length p of the division track.

This construction of the division track 30 offers an alternative method for generating the switching signals necessary for position determination. This is explained relative to FIG. 5, where, as in FIG. 3, the measuring signals of sensors C1, C2, C3 and C4 are plotted against the displacement x of the first object 10 relative to the second object 20. There are also switching signals S1, S2 obtained with the same logical condition as in FIG. 3, i.e., S1=1 if the maximum switching signal comes either from C1 or C2 and otherwise S1=0. Moreover S2=1 if the maximum switching signal comes from one of the sensors C2 or C3 and is otherwise S2=0.

Switching signals S3 and S4 are obtained by an alternative method for which the sensors C1 and C3 are combined into a first sensor unit and sensors C2 and C4 into a second sensor unit.

Evaluation now takes place in such a way that switching signal S3 is set to 1 if sensor C1 supplies a higher measuring signal than sensor C3. As is apparent from the table of FIG. 5, this is, e.g., the case with displacement values x=0.51, 1.05, 1.51 and 2.01. Otherwise signal S3 is set to 0. Correspondingly signal S4 is switched to 1 if sensor C2 supplies the higher measuring signal than sensor C4. In the example of FIG. 5 this is particularly the case at displacement positions x=1.51, 2.01, 2.51 and 3.01. Otherwise switching signal S4 is set to 0, i.e., if the measuring signal of sensor C4 is higher than that of sensor C2.

Figures 6, 7:
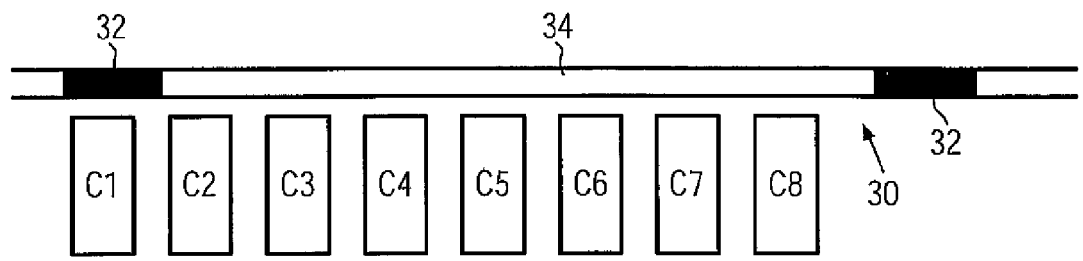
FIG. 6 depicts a fourth embodiment of the inventive incremental displacement transducer with eight sensors.
FIG. 7 depicts, in table form, measuring signals and switching signals plotted against a displacement of the first object relative to the second object for the embodiment of FIG. 6.

A fourth embodiment of an inventive incremental displacement transducer is explained in conjunction with FIGS. 6 and 7. As is apparent from the diagrammatic view of FIG. 6, over a period p of a division track there are in all eight sensors C1 to C8 with a spacing of in each case ⅛ of the period length p. As in the preceding examples, the division track is located at a second object, which is not shown here so as not to overburden representation. As in the preceding variants, the sensors form part of a scanning unit located at a first object, which is also not shown here.

The table of FIG. 7 shows paths of measuring signals obtained for such a sensor arrangement. For the displacement x of the first object relative to the second object, once again specific points are selected where the switching behavior can be made particularly easily clear. The switching signal S1 is switched to 1 if one of the sensors C1, C2, C5 or C6 supplies the maximum measuring signal and otherwise S1=0 applies.

Switching signal S2 is switched to 1 if the maximum measuring signal is supplied by one of the sensors C2, C3, C6 or C7 and correspondingly S2 is otherwise 0. The embodiment of FIGS. 6 and 7 makes it particularly clear that, unlike in the hitherto existing incremental displacement transducers, the division track 30 can fundamentally have a random division ratio and that independently of this it is possible to generate switching signals with a 90° phase displacement and in each case a scanning ratio of 1:1. This permits particularly universal applications in the industrial sector.

The present invention provides a novel incremental displacement transducer in which a signal formation results from a comparison of sensor values, e.g., from four single sensors, which are arranged with a spacing of ¼ of the period of a code bar or division track.

As an important difference compared with the hitherto existing methods, the web-hole grid of the code bar need not have a 1:1 ratio and can instead have other values, particularly 1:4 or 1:8. In the present invention evaluation takes place of which of the sensors supplies the maximum signal.

Due to the evaluation of the maxima the evaluation is largely spacing-independent, because it is not dependent on the absolute measured values of the individual sensors.

The method of the present invention can be used for a random number of sensors per period. As a result of the greater number of sensors per period it is also possible to increase the precision of the displacement determination. For example, with eight sensors, as shown in the case of FIGS. 6 and 7, two pulses per period of the division track 30 can be generated.

The foregoing description of the embodiments of this invention has been presented for purposes of illustration and description. It is not intended to be exhaustive or to limit the invention to the precise form disclosed, and obviously, many modifications and variations are possible.

The invention claimed is:

1. An incremental displacement transducer for determining a displacement of a first object relative to a second object, comprising:
   a scanning unit linked with the first object for scanning a division track linked with the second object, the division track comprising first areas and second areas arranged in alternating manner with a period length, in which the first areas have a first physical property and the second areas a second physical property differing from the first physical property, wherein the scanning unit has a plurality of sensors for scanning the first areas and second areas on a basis of at least one of the first and second physical property and for providing corresponding measuring signals, and wherein the scanning unit comprises at least three sensors spaced from one another over at least one period length; and
   an evaluating unit linked with the scanning unit for determining the displacement on a basis of the measuring signals of the sensors, wherein a first switching signal and a second switching signal are generated from the measuring signals of the sensors for the determination of the displacement, wherein the first switching signal assumes a first value if a particular one of the sensors belonging to a first subgroup of sensors emits a maximum measuring signal and otherwise assumes a second value, wherein the second switching signal assumes a first value if a particular one of the sensors belonging to a second subgroup of the sensors emits a maximum measuring signal and otherwise assumes a second value, and wherein at least one of the sensors belongs to both the first subgroup and the second subgroup.

2. The incremental displacement transducer according to claim 1, wherein the sensors are arranged in a uniformly spaced manner.

3. The incremental displacement transducer according to claim 1, wherein the first areas are electrically conductive and the second areas are electrically insulating, and wherein the sensors are inductive sensors.

4. The incremental displacement transducer according to claim 1, wherein the scanning unit comprises first, second, and third sensors, wherein the first subgroup is formed by the first and second sensors, and wherein the second subgroup is formed by the second and third sensors.

5. The incremental displacement transducer according to claim 1, wherein the scanning unit comprises first, second, third, and fourth sensors, wherein the first subgroup is formed by the first and second sensors, and wherein the second subgroup is formed by the second and third sensors.

6. The incremental displacement transducer according to claim 1, wherein the scanning unit comprises first, second, third, fourth, fifth, sixth, seventh, and eighth sensors, wherein the first subgroup is formed by the first, second, fifth, and sixth sensors and wherein the second subgroup is formed by the second, third, sixth, and seventh sensors.

7. The incremental displacement transducer according to claim 1, wherein the division track is formed by a hole grid.

8. The incremental displacement transducer according claim 1, wherein the first subgroup and second subgroup comprise a same number of sensors.

9. The incremental displacement transducer according to claim 1, wherein the first subgroup and the second subgroup in each case comprise half of all the sensors.

10. Method for determining a displacement of a first object relative to a second object, comprising:
    scanning, using a scanning unit linked with the first object, a division track linked with the second object, the division track comprising first areas and second areas arranged in alternating manner with a period length, in which the first areas have a first physical property and the second areas a second physical property differing from the first physical property, wherein the scanning unit has a plurality of sensors for scanning the first areas and second areas on a basis of at least one of the first and second physical property and for providing corresponding measuring signals, and wherein the scanning unit comprises at least three sensors spaced from one another over at least one period length; and
    determining the displacement on a basis of the measuring signals of the sensors, wherein a first switching signal and a second switching signal are generated from the measuring signals of the sensors for the determination of the displacement, wherein the first switching signal assumes a first value if a particular one of the sensors belonging to a first subgroup of sensors emits a maximum measuring signal and otherwise assumes a second value, wherein the second switching signal assumes a first value if a particular one of the sensors belonging to a second subgroup of the sensors emits a maximum measuring signal and otherwise assumes a second value, and wherein at least one of the sensors belongs to both the first subgroup and the second subgroup.

11. The method according to claim 10, wherein the sensors are arranged in a uniformly spaced manner.

12. The method according to claim 10, wherein the first areas are electrically conductive and the second areas are electrically insulating, and wherein the sensors are inductive sensors.

13. The method according to claim 10, wherein the scanning unit comprises first, second, and third sensors, wherein the first subgroup is formed by the first and second sensors, and wherein the second subgroup is formed by the second and third sensors.

14. The method according to claim 10, wherein the scanning unit comprises first, second, third, and fourth sensors, wherein the first subgroup is formed by the first and second sensors, and wherein the second subgroup is formed by the second and third sensors.

15. The method according to claim 10, wherein the scanning unit comprises first, second, third, fourth, fifth, sixth, seventh, and eighth sensors, wherein the first subgroup is formed by the first, second, fifth, and sixth sensors and wherein the second subgroup is formed by the second, third, sixth, and seventh sensors.

16. The method according to claim 10, wherein the division track is formed by a hole grid.

17. The method according claim 10, wherein the first subgroup and second subgroup comprise a same number of sensors.

18. The method according to claim 10, wherein the first subgroup and the second subgroup in each case comprise half of all the sensors.

* * * * *

UNITED STATES PATENT AND TRADEMARK OFFICE
CERTIFICATE OF CORRECTION

| | | |
|---|---|---|
| PATENT NO. | : 7,535,216 B2 | Page 1 of 1 |
| APPLICATION NO. | : 12/120772 | |
| DATED | : May 19, 2009 | |
| INVENTOR(S) | : Speckmann et al. | |

It is certified that error appears in the above-identified patent and that said Letters Patent is hereby corrected as shown below:

On the Title Page, Item Number (75), Inventors:, Second Line, Please delete "Timo Glam" and Insert -- Timo Galm --.

Signed and Sealed this

Fourth Day of August, 2009

JOHN DOLL
*Acting Director of the United States Patent and Trademark Office*